United States Patent
Anttila et al.

Patent Number: 5,575,614
Date of Patent: Nov. 19, 1996

[54] METHOD AND APPARATUS FOR SEPARATING BUNDLES OF SAWN TIMBER

[75] Inventors: Seppo Anttila, Espoo; Reijo Taalikka, Vantaa, both of Finland

[73] Assignee: Woodma Oy, Helsinki, Finland

[21] Appl. No.: 540,082

[22] Filed: Oct. 6, 1995

[30] Foreign Application Priority Data

Oct. 19, 1994 [FI] Finland .................... 944897

[51] Int. Cl.$^6$ .................... B65G 59/12; B65G 3/04
[52] U.S. Cl. .................... 414/797.6; 414/797.9; 414/786
[58] Field of Search .................... 414/297.4, 797.6, 414/797.9, 786

[56] References Cited

U.S. PATENT DOCUMENTS

| | | | |
|---|---|---|---|
| 2,345,937 | 4/1944 | Joa | 414/797.9 |
| 2,357,631 | 9/1944 | Coleman et al. | 414/797.9 |
| 2,680,510 | 6/1954 | Donath | 414/797.9 |
| 2,696,311 | 12/1954 | Nordström | 414/797.6 |
| 3,952,883 | 4/1976 | Phillips | 414/797.9 |
| 4,000,821 | 1/1977 | Naito et al. | 414/797.6 |
| 4,844,686 | 7/1989 | Stevenson | 414/797.9 |

Primary Examiner—David A. Bucci
Assistant Examiner—Douglas Hess
Attorney, Agent, or Firm—Steinberg, Raskin & Davidson P.C.

[57] ABSTRACT

A method and apparatus for separating pieces of sawn timber from bundles coming out of a sawing machine. The bundles, when emerging longitudinally from the sawing machine, are transferred in their transverse direction individually and sequentially to at least one unloading station and the bundles are unloaded from beneath, i.e., from the lowermost one of the pieces, using gripping members sequentially passing through the unloading station(s) and engaging with the lowermost piece of timber. The separated pieces of sawn timber unloaded from the bundles are transported at regular intervals onwards.

10 Claims, 3 Drawing Sheets

METHOD AND APPARATUS FOR SEPARATING BUNDLES OF SAWN TIMBER

FIELD OF THE INVENTION

The present invention relates to a method for unloading and separating sawn timber pieces from bundles of such timber pieces cut from logs in a sawing machine.

In addition, the present invention relates to an apparatus for unloading and separating pieces of sawn timber from bundles which timber pieces have been cut from logs in a sawing machine and to otherwise implement the method in accordance with the invention.

Generally, such an apparatus in accordance with the invention includes a longitudinal conveyor for bundles of sawn timber coming from the sawing machine, and a combination of a transfer conveyor and an unloading conveyor for bundles of sawn timber arranged to be in conjunction therewith.

BACKGROUND OF THE INVENTION

Along with developing the log sawing technique, efficient sawing machines have entered the market, with the aid of which the wood contents of a log can be almost completely be comminuted, i.e., cut into separable pieces, in one sawing unit into finished sawn timber. This has been made possible by the combined use of saw blades and milling cutters, which is a so-called profilation technique. The contents of a log coming out of a sawing machine is a stick or a bundle of sawn timber pieces of given sizes which depend on the size of the log as it enters into the sawing machine. As known in the prior art, the bundles of sawn timber are cut into separable yet adjoining pieces, conventionally mainly by stacking, whereafter the sawn timber stacks are unloaded and separated using log hoists and piece lifters. The prior art methods and apparatus have drawbacks in that a great variety of different apparatus are needed and that some sawn timber breaks into pieces during handling.

OBJECTS AND SUMMARY OF THE INVENTION

Accordingly, it is an object of the present invention to provide a new and improved method and apparatus for unloading and separating bundles of sawn timber comminuted from logs coming out of a sawing machine.

Another object of the present invention is to provide a novel method and an apparatus for transferring and unloading comminuted timber bundles so that the drawbacks mentioned above with respect to conventional methods and apparatus are substantially avoided since the method and the apparatus can be implemented to be simpler than in the past and thus, less expensive.

A further object of the present invention is to provide such a method and apparatus wherein breaking of timber into pieces is substantially reduced compared to the conventional applications.

In order to achieve the objects mentioned above, and others, in accordance with the invention, bundles being passed in a longitudinal direction from a sawing machine are transferred in their transverse direction in a controlled manner one by one to an unloading station or unloading stations and bundles formed from superimposed sawn timber pieces are unloaded from below with consecutive rows of gripping means located in or arranged to pass through the unloading station or stations. The sawn timber pieces unloaded from the bundles are transported at regular intervals onwards, e.g., to further handling and/or processing.

In accordance with the apparatus of the present invention, a transverse conveyor of sawn timber bundles is arranged in conjunction with a longitudinal conveyor whereby the sawn timber bundles coming from the longitudinal conveyor are transferred to an unloading station or unloading stations by the transverse conveyor. In connection with the transverse conveyor, an unloading conveyor is located, with gripping means fastened to the conveyor belts or chains by means of which the lowermost sawn timber pieces of the sawn timber bundles in the unloading station or unloading stations are transferred at regular intervals onwards. This results from the intermittent passage of the gripping means through the unloading station(s).

According to the present invention, the pieces are in general placed one on top of the other in bundles coming from the longitudinal conveyor from the sawing machine. They are transferred, without being unloaded in the meantime, to unloading stations according to the present invention in which the bundles are most preferably held in place, by the force of gravity, with pushers of the transverse transfer conveyor while bundles are being unloaded from beneath, most preferably one by one with the unloading conveyor, and transported on at regular, timed intervals. In this manner, the unloading and transfer method of the present invention can be implemented using a simple and straightforward construction in which the pieces of timber are not susceptible to damage.

In the invention, two or more unloading stations are preferably used, whereby the bundles which act as intermediate storage so that the varying capacity of different apparatus can be evened out.

In a most basic embodiment, the method for unloading elongate timber pieces from bundles formed in a sawing machine in accordance with the invention comprises the steps of transferring the bundles in a direction transverse to their longitudinal direction to at least one unloading station, and unloading the timber pieces from the bundles in the transverse direction by intermittently directing gripping means through the unloading station(s) to grip a lowermost one of the timber pieces in the bundle. In this manner, each of the timber pieces is sequentially separated from the bundle. The bundles are directed from the sawing machine on a remover conveyor, in which case the transferring step comprises the steps of arranging pusher means on a transfer conveyor, and directing the transfer conveyor in path such that the pusher means engage with the bundles on the remover conveyor and move the bundles from the remover conveyor to the unloading station(s). The bundles may be held in place in the unloading station(s) by means of the pusher means. The transfer of the bundles to the unloading station(s) and the separation of each of the timber pieces from the bundle may be carried out in substantially the same direction. The bundles may also be transferred to the unloading station(s) by continuously moving the bundles thereto or, alternatively, by intermittently moving the bundles thereto.

In another more specific embodiment, the step of transferring the bundles to the unloading station(s) comprises the steps of transferring the bundles to at least first and second unloading stations arranged in a direction of unloading, each of the first and second unloading stations having a first position and a second elevated position, the gripping means engaging the timber pieces when the first and second unloading stations are in the first position, and moving the first and second unloading stations to the second position during transfer of the bundles to the first and second unloading stations. Also, the step of unloading the timber pieces from the bundles comprises the steps of selectively moving the first and second unloading stations to the first position such that the gripping means engage the timber pieces of the bundle.

The apparatus for separating elongate timber pieces from bundles coming from a sawing machine comprises, in a most basic embodiment, a transverse conveyor for transferring the bundles of timber in a direction transverse to their longitudinal direction to at least one unloading station, an unloading conveyor arranged to carry timber pieces from the bundles from the unloading station(s), and gripping means mounted to the unloading conveyor for engaging a lowermost piece of timber of the bundles as the gripping means pass through the unloading station(s). A remover conveyor may also be provided for carrying the bundles from the sawing machine. In this case, the transverse conveyor comprises pusher means for moving the bundles from the remover conveyor to the unloading station(s) and the unloading conveyor is positioned in a vertically upward orientation at sufficient inclination angle so that the bundles in the unloading station(s) are held against the pusher means and are carried upward by the gripping means. The transfer conveyor may be arranged above an end of the remover conveyor and a lower end of the unloading conveyor. The transfer conveyor may also include conveyor belts or chains and hinge means for hingedly connecting the pusher means to the conveyor belts or chains. The hinge means comprise shaft journals arranged such that the pusher means move the bundles from the remover conveyor to the unloading station(s) but allow the gripping means to engage the pieces of timber at a location below the pusher means.

The invention is described below more in detail, reference being made to an embodiment example of the invention presented schematically in the figures of the accompanying drawing. However, the invention is not confined to the details of the illustrated embodiment alone.

BRIEF DESCRIPTION OF THE DRAWINGS

The following drawings are illustrative of embodiments of the invention and are not meant to limit the scope of the invention as encompassed by the claims.

FIG. 2A also shows a highly schematical presentation in the form of a block diagram of a control system with which the method and the apparatus in accordance with the invention are controlled.

DETAILED DESCRIPTION OF THE INVENTION

Figure 1:
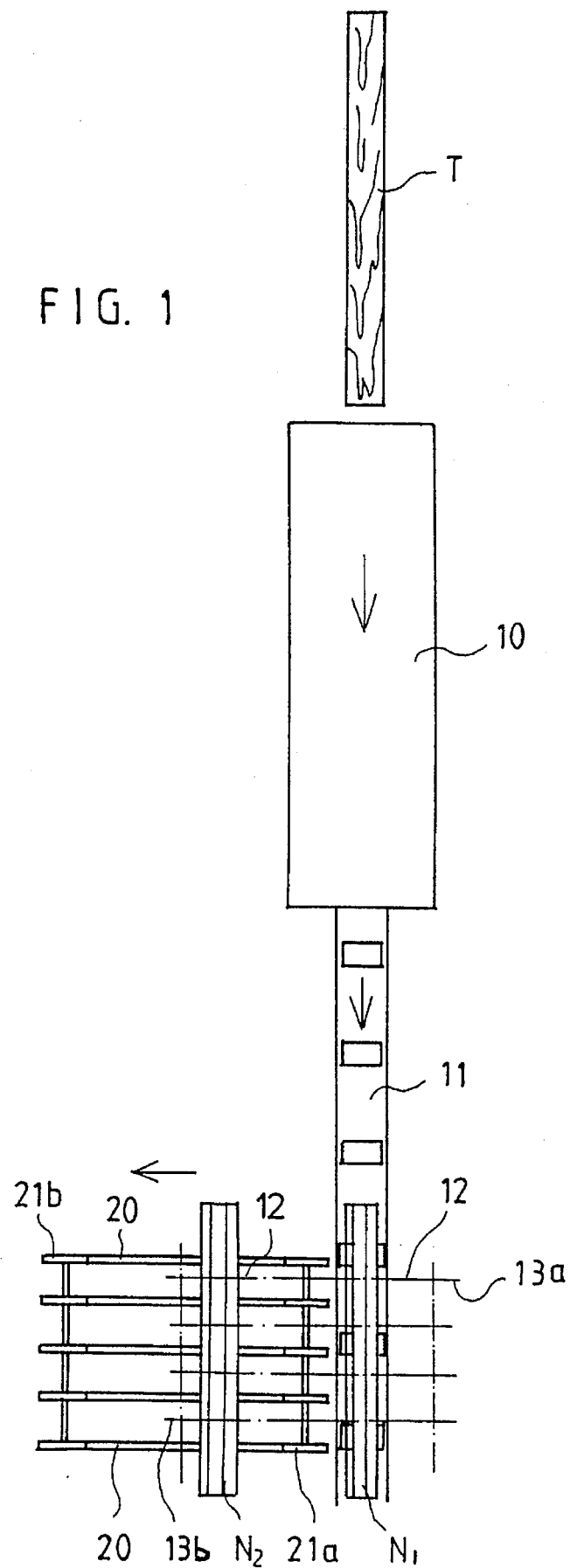
FIG. 1 is a top view of a profilation sawing machine, and in conjunction therewith, a transfer and unloading device for bundles of sawn timber according to the present invention.

Referring to the accompanying drawings wherein the same reference numerals refer to the same or similar elements, FIG. 1 shows diagrammatically in top view apparatus related to the sawing, transfer and unloading processes of sawn timber bundles. A log T is comminuted, separate into numerous smaller pieces, in a sawing machine 10 and the bundle of sawn timber thus-produced is transferred onwards out of the machine with a remover conveyor 11 to a lateral transfer station $N_1$. The sawing machine 10 is a machine applying the so-called profilation technique, in which the combined use of saw webs and milling cutters is applied, advantageously in that when profiling the outer part of a log, the milling cutters produce wood chips, useful as raw material for wood pulp.

FIGS. 2A, 2B, 2C and 2D present different steps showing the transfer and unloading system of sawn timber bundles $N_0$ $N_2$, $N_3$ and a construction applicable for implementing the method in accordance with the present invention.

Figure 2A:
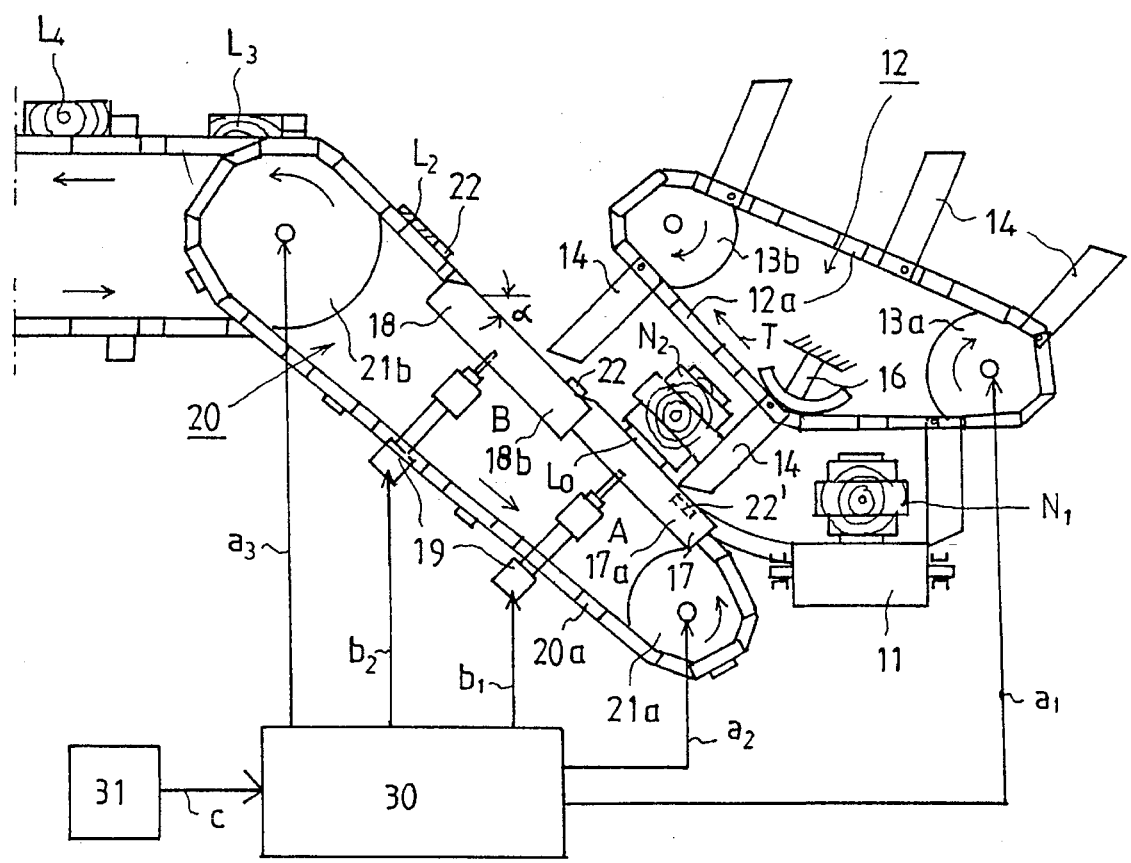
FIGS. 2A, 2B, 2C and 2D show various phases of the method of the invention and an advantageous design for embodying the method.

FIG. 2A shows an end view of a situation in which a bundle of sawn timber $N_1$ has just arrived from the sawing machine 10 on the remover conveyor 11 leading from the outlet of the sawing machine 10. A preceding bundle $N_2$ has been transferred to a first unloading station A. The transfer of bundles $N_1$, $N_2$, $N_3$ is carried out by a lateral transfer conveyor 12 which in the illustrated embodiment is disposed above the remover conveyor 11 and provided with two or more parallel transport belts, preferably chains 12a. The chains 12a travel in a path guided by idler sheaves 13a and 13b and a glide guide 16. Pushers 14 are fastened at regular intervals to each chain 12a. The length or projecting dimension of the pushers 14 is greater than the height of the largest bundles N, i.e., the gripping means have a gripping range smaller than the thickness of the thinnest timber piece of the bundles. The pushers 14 are hinged to the transport chains 12a with shaft journals 15 so that the pushers 14 are rigid in the pushing direction T but so pivoted that they allow the passing of the timber pieces discharging from behind (pushers 14' and piece $L_1$ in FIG. 2D). The conveyor 12 operates stopping intermittently when the bundles $N_1$, $N_2$ arrive at an unloading station A,B.

An unloading conveyor or carrier 20 of bundles N is arranged below the transfer conveyor 12. To the transport belts of the unloading carrier 20, which are most advantageously chains 20a, gripping means 22 are mounted at regular intervals, their range not exceeding the thickness of the thinnest board $L_0$ of the bundles in the unloading station A,B. The chains 20a of the unloading conveyor 20 are arranged about idler sheaves 21a and 21b most advantageously so that the trailing idler sheave 13b of the transfer conveyor 12 is substantially in the same vertical position as the preceding idler sheave 21a of the unloading conveyor 12 and so that the unloading conveyor 20 is in its transport direction at an angle α (FIG. 2A) at the upper diagonal. The gripping means 22 pull the lowermost piece L from the bundles $N_1$, $N_2$ in the unloading stations A,B to be transported further in the regular spaces of conveyor 20. The range of the gripping means 22 can be adjusted to be between the positions 17a–17b and 18a–18b of the support means 17,18 as described below. The inclination angle α of the conveyor 20 is required to be large enough so that the bundles $N_1,N_2$ remain secured, supported by means of gravity to the pusher means 14, when a bundle $N_1$, $N_2$ is unloaded from below with the gripping means 22.

Figure 2B:
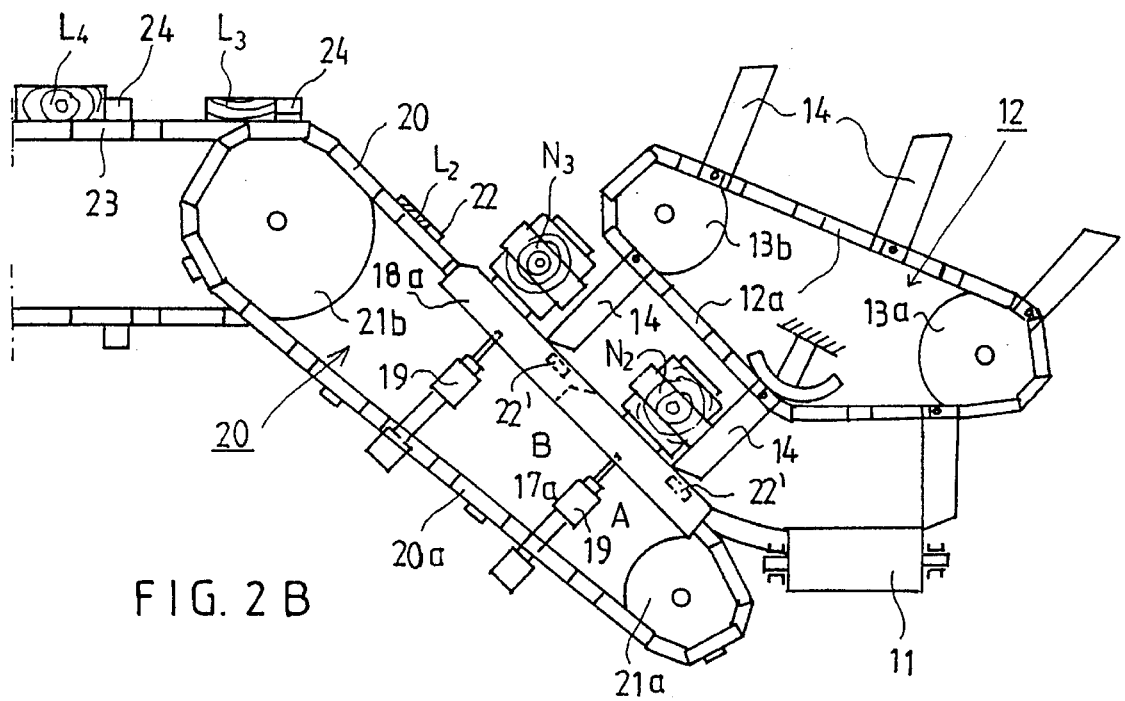
Figure 2C:
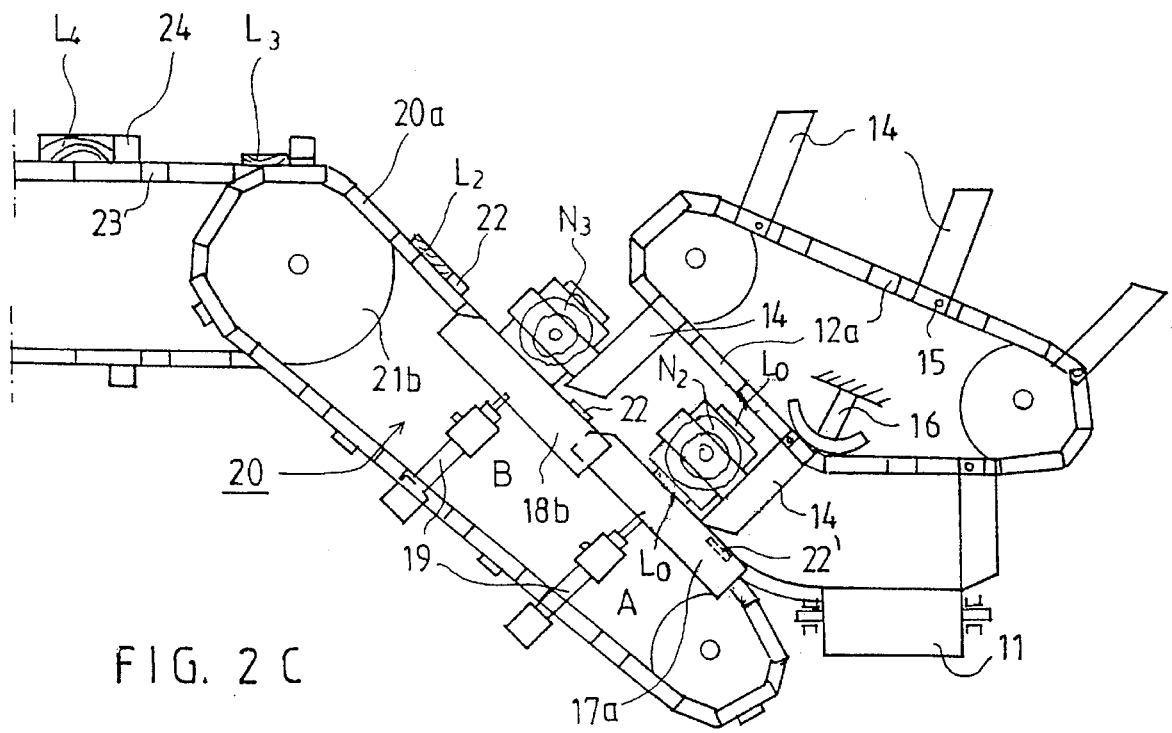
Figure 2D:
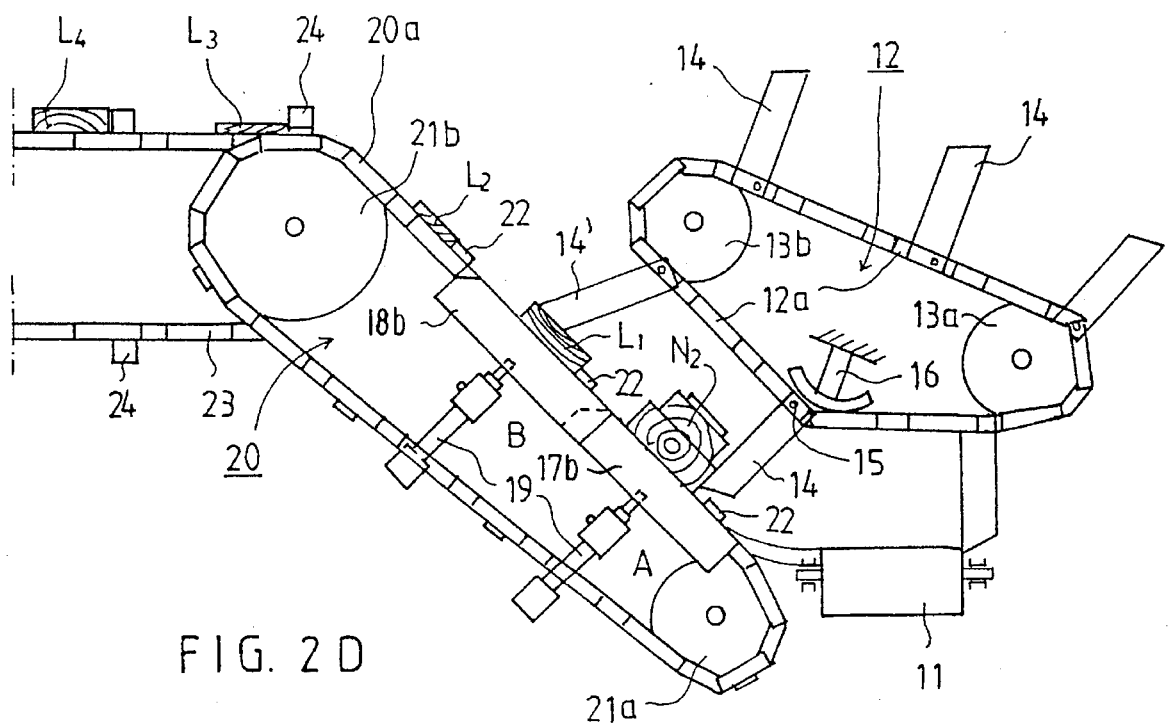

In the transport plane of the unloading conveyor 20, two consecutive unloading stations A and B have been provided, in association with which are located support means 17,18 driven by actuation cylinders 19 or equivalent actuation means. When a bundle $N_2$ is transferred, as in FIG. 2A, into unloading station A, the support means 17 is in upper position 17a. When a bundle is moved to the other unloading station B (bundle $N_3$), both support means 17 and 18 are in upper positions 17a and 18a (FIG. 2B). The support means 18 is in lower position 18b when bundle $N_3$ is being unloaded in the other unloading station B (FIG. 2C). The support means 17 and 18 are in lower positions 17b and 18b when bundle $N_3$ is being unloaded in the first unloading station A (FIG. 2D).

In the adjacency of the upper end of the unloading conveyor 20, there are arranged transporting chains 23 provided with gripping means 24, into the regular spaces whereof the gripping means 22 of the unloading conveyor 20 move pieces of sawn timber $L_2$, $L_3$ and $L_4$ unloaded from bundles $N_2$ and $N_3$ in the unloading stations A and B.

FIG. 2A presents schematically a control unit 30, to control by means of control signals $a_1$, $a_2$ and $a_3$ emitted therefrom the operations of the transfer conveyor 12, the unloading conveyor 21 and the horizontal conveyor 23,24 phased appropriately relative to each other. In addition, by means of control signals $b_1$ and $b_2$ generated in the control unit 30, the actuation cylinders 19 of the support means 17,18 are controlled. If needed, control signals c are directed into the control unit 30 from different sensors 31 to inform the control system of the operation steps of different means and the arrival of, e.g., a timber bundle $N_1$ from the sawing machine 10 for unloading. It should be emphasized that the control system 30,31 is highly schematical and it can be implemented in a number of different ways and with different apparatus known as such to a person skilled in the art.

There are two or more unloading stations A,B for bundles N, their additional function being to serve as a transitional storage to balance stoppages caused for other reasons by brief interruptions in sawing while processing further the timber. The transitional storage can be complemented by slowing down temporarily the speed of the unloading conveyor 20. The method of the invention can be provided with one unloading station A only if the extended process is of the kind that no transitional storage is needed. The unloading speed of the transfer conveyor 12 is selected so as to be enabled in each case to unload the quantity of bundles sent from the sawing machine 10.

FIGS. 2A–2D present only one advantageous apparatus embodiment for performing the method of the invention. The method of the invention can be implemented even if the means used in the method deviated greatly from those introduced above. For instance, the transfer conveyor 12 can be disposed also below the bundles N with the pushers 14 arranged upwards. The transfer conveyor 12 may also be comprised of stepwise movable individual pairs of conveyors.

According to the present invention, bundles $N_1$, $N_2$ may be sent from the sawing with timber blocks L arranged in parallel, whereby, prior to transverse transfer of bundle N, or in adjacency therewith, bundle N is turned, using a prior art device or method, from beneath into a position to be unloaded as taught by the invention.

The examples provided above are not meant to be exclusive. Many other variations of the present invention would be obvious to those skilled in the art, and are contemplated to be within the scope of the appended claims.

I claim:

1. A method for unloading elongate timber pieces from bundles formed in a sawing machine, the bundles having a longitudinal direction, comprising the steps of:

transferring the bundles in a direction transverse to their longitudinal direction to at least first and second unloading stations arranged in a direction of unloading, each of said first and second unloading stations having a first position and a second elevated position, said first and second unloading stations being in said second elevated position during transfer of the bundles to said first and second unloading stations, and unloading the timber pieces from the bundles in the transverse direction by intermittently directing gripping means through said first and second unloading stations to grip a lowermost one of the timber pieces in the bundle to thereby sequentially separate each of the timber pieces from the bundle, said gripping means engaging the timber pieces in said first unloading station when said first unloading station is in said first position and not when said first unloading station is in said second elevated position and engaging the timber pieces in said second unloading station when said second unloading station is in said first position and not when said second unloading station is in said second elevated position, said step of unloading the timber pieces from the bundles comprising the steps of moving said first and second unloading stations from said second elevated position to said first position such that said gripping means engage the timber pieces of the bundle.

2. The method of claim 1, wherein the bundles are directed from the sawing machine on a remover conveyor, said transferring step comprises the steps of:

arranging pusher means on a transfer conveyor, and directing said transfer conveyor in path such that said pusher means engage with the bundles on said remover conveyor and move the bundles from said remover conveyor to said first and second unloading stations.

3. The method of claim 2, further comprising the step of holding the bundles in place in said first and second unloading stations by means of said pusher means.

4. The method of claim 1, further comprising the step of carrying out the transfer of the bundles to said first and second unloading stations and the separation of each of the timber pieces from the bundle in a substantially common direction.

5. The method of claim 1, wherein the step of transferring the bundles to said first and second unloading stations comprises the step of continuously moving the bundles to said first and second unloading stations.

6. The method of claim 1, wherein the step of transferring the bundles to said first and second unloading stations comprises the step of intermittently moving the bundles to said first and second unloading stations.

7. The method of claim 1, wherein the step of unloading the timber pieces from the bundles comprises individually unloading the timber pieces from the bundles, further comprising the step of providing said gripping means with a gripping range smaller than a thickness of the thinnest timber piece of the bundles.

8. An apparatus for separating elongate timber pieces from bundles coming from a sawing machine, the bundles having a longitudinal direction, comprising:

a transverse conveyor for transferring the bundles of timber in a direction transverse to their longitudinal direction to at least one unloading station, an unloading conveyor arranged to carry timber pieces from the bundles from said at least one unloading station, gripping means mounted to said unloading conveyor for engaging a lowermost piece of timber of the bundles as said gripping means pass through said at least one unloading station, and a remover conveyor for carrying the bundles from the sawing machine, said transfer conveyor being arranged above an end of said remover conveyor and a lower end of said unloading conveyor, said transverse conveyor comprising pusher means for moving the bundles from said remover conveyor to said at least one unloading station, conveyor belts or chains and hinge means for hingedly connecting said pusher means to said conveyor belts or chains, said unloading conveyor being positioned in a vertically upward orientation at an inclination angle such that the bundles in said at least one unloading station are held against said pusher means and are carried upward by said gripping means, said hinge means comprising shaft journals arranged such that said pusher means move the bundles from the remover conveyor to said at least one unloading station but allow said gripping means to engage the pieces of timber at a location below said pusher means.

9. The apparatus of claim 8, wherein said unloading conveyor comprises conveyor belts or chains moving in a vertically upward direction through said at least one unloading station, further comprising:

support means defining said at least one unloading station for supporting the bundles of timber, said support means comprising an actuation cylinder for displacing said support means between a first position in which said gripping means engage with the timber pieces and a second, elevated position in which said gripping means do not engage with the timber pieces.

10. An apparatus for separating elongate timber pieces from bundles coming from a sawing machine, the bundles having a longitudinal direction, comprising:

a transverse conveyor for transferring the bundles of timber in a direction transverse to their longitudinal direction to at least one unloading station, an unloading conveyor arranged to carry timber pieces from the bundles from said at least one unloading station, said unloading conveyor comprising conveyor belts or chains moving in a vertically upward direction through said at least one unloading station, gripping means mounted to said unloading conveyor for engaging a lowermost piece of timber of the bundles as said gripping means pass through said at least one unloading station, a remover conveyor for carrying the bundles from the sawing machine, said transverse conveyor comprising pusher means for moving the bundles from said remover conveyor to said at least one unloading station, said unloading conveyor being positioned in a vertically upward orientation at an inclination angle such that the bundles in said at least one unloading station are held against said pusher means and are carried upward by said gripping means, and support means defining said at least one unloading station for supporting the bundles of timber, said support means comprising an actuation cylinder for displacing said support means between a first position in which said gripping means engage with the timber pieces and a second, elevated position in which said gripping means do not engage with the timber pieces.

\* \* \* \* \*